United States Patent
Marten et al.

[15] 3,702,075
[45] Nov. 7, 1972

[54] VEHICLE TESTING APPARATUS

[72] Inventors: John Atnhony Marten, Holt; Bernard Arthur Gene, Marham, both of England

[73] Assignee: Suntester Limited, Norfolk, England

[22] Filed: March 29, 1971

[21] Appl. No.: 128,994

[30] Foreign Application Priority Data

March 31, 1970 Great Britain..........15,224/70

[52] U.S. Cl.....................................73/117, 73/134
[51] Int. Cl................................................G01l 5/13
[58] Field of Search..............................73/117, 134

[56] References Cited

UNITED STATES PATENTS 3,465,578   9/1969   Douglas........................73/117
2,982,128   5/1961   Gibson et al..................73/117
2,785,367   3/1957   Roman et al..............73/134 X Primary Examiner—Jerry W. Myracle
Attorney—Molinare, Allegretti, Newitt & Witcoff

[57] ABSTRACT

The disclosure describes a chassis dynamometer in combination with control means comprising an amplifier, respective inputs of which are fed to a speed signal dependent on the speed of rotation of the rollers of the dynamometer and to a reference signal. The output of the amplifier is selectively fed either to means controlling the braking torque of the dynamometer, the arrangement being such that a negative feed back loop is completed, or alternatively to the input of a store, from the output of which the reference signal is derived, so as to maintain the reference signal at a value corresponding to the speed of rotation of the rollers.

4 Claims, 3 Drawing Figures

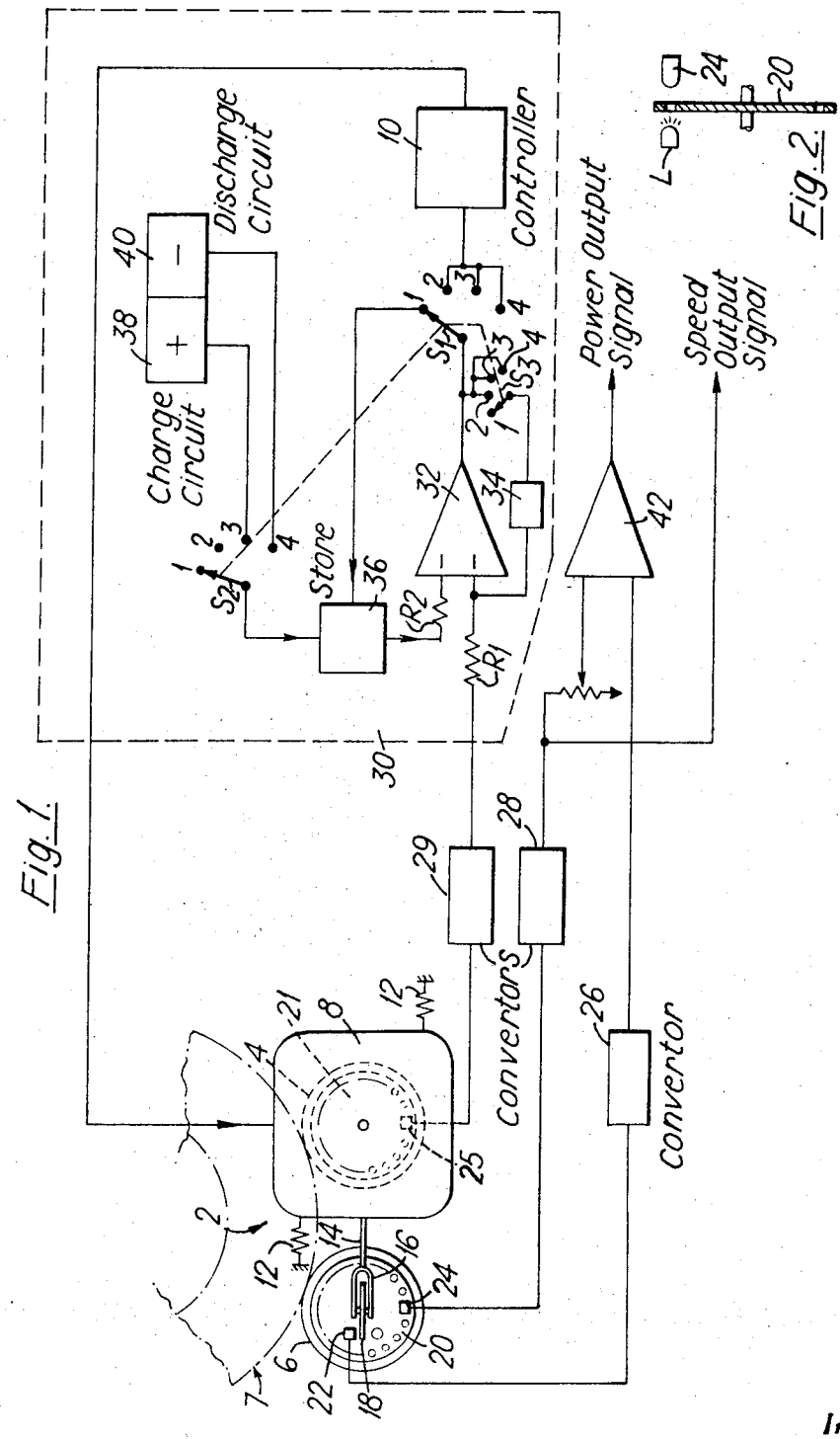

3,702,075

VEHICLE TESTING APPARATUS

BACKGROUND OF THE INVENTION

This invention relates to chassis dynamometers.

Chassis dynamometers are used for measuring the tractive effort or power of motor driven vehicles and have at least one roller, or preferably at least one pair of spaced parallel rollers, for driving engagement with at least one traction wheel of the motor vehicle. Braking torque is applied to at least one of the rollers in each pair of rollers, for example, by an eddy current brake. In order to measure the power absorbed by the dynamometer, which is substantially equal to the power output of a vehicle being tested, it has in the past been necessary manually to carefully balance the torque absorbed by the dynamometer against the torque of the engine so that no acceleration takes place. Then meters indicating the speed and power output of the engine are read. This process is time consuming and requires a considerable degree of skill on the part of the operator. The need to balance the engine torque against the torque absorbed by the chassis dynamometer arises from the fact that if acceleration is allowed to take place (due to unbalance in the respective torques) some of the engine torque is used in accelerating the inertia of the dynamometer when the acceleration is positive. On the other hand, when the acceleration is negative, the torque taken in decelerating the inertia of dynamometer aids the vehicle's engine. In either case the process leads to a false reading of the engine power.

SUMMARY OF THE INVENTION

Applicants have invented improved apparatus for controlling the speed of the rollers of a dynamometer that are moved by a source of power, such as a motor vehicle. According to a principal feature, the invention comprises means for generating a speed signal dependent on the speed of at least one of the dynamometer rollers, store means for providing a reference signal, and control means for comparing the speed signal with the reference signal. Selection means are also provided to enable two modes of operation. In the first mode of operation, the control means control the braking torque developed by the dynamometer so that the speed of the dynamometer rollers is maintained at a value corresponding to the value of the reference signal. In the second mode of operation the control means charges the store means so that the reference signal is maintained at a value corresponding to the speed of the one dynamometer roller.

In use the vehicle to be tested is driven onto the chassis dynamometer so that its traction wheels are supported by and in driving contact with the rollers of the dynamometer. The selection means is operated so as to charge the store means, and the vehicle is "driven" up to a speed at which a reading is required. As soon as that speed is reached, the selection means is then switched to operate the control means to maintain the torque developed by the dynamometer at such a value as to maintain the speed substantially constant irrespective of the throttle opening of the vehicle's engine. The throttle may thus be opened up, say to full power, and the required reading taken. It will be appreciated that such use of the vehicle testing apparatus can save considerable time over the above described previously used method of using a chassis dynamometer.

According to another feature of the invention, the control means comprise an amplifier respective inputs of which are fed with the speed signal and the reference signal by operation of the selection means. The output of the amplifier is either fed to means controlling the braking torque of the dynamometer, the arrangement being such that a negative feed back loop is completed, or is alternatively fed to an input of the store so as to maintain the reference signal at a value corresponding to the speed of rotation of the rollers.

The control means advantageously include charging and/or discharging means which may be selectively activated when the control means is activated so as to respectively charge or discharge the store at a constant rate. In this case it will be appreciated that the activation of the charging or discharging means will cause the torque developed by the dynamometer to be so controlled that the speed of rotation of the dynamometer's rollers will linearly increase or decrease respectively, i.e., at constant acceleration. It will thus be further appreciated that in the first case, a constant torque is applied by the vehicle to accelerate the rollers, and in the second case, a constant torque is applied by the dynamometer in order to brake the structure of the rollers. Thus it will be seen that in either case the difference between the torque developed by the vehicle and the braking torque developed by the dynamometer is constant and thus the power lost in one case is directly proportional to the speed of rotation of the dynamometer's rollers. In this case, therefore, by summing a signal proportional to the braking power developed by the chassis dynamometer and the signal proportional to the speed of rotation of the dynamometer's rollers a signal proportional to the power output of a vehicle may be obtained.

DESCRIPTION OF THE DRAWINGS

These and other advantages and features of the present invention will hereafter appear for purposes of illustration, but not of limitation, in connection with the accompanying drawings, wherein like numbers refer to like parts throughout, and wherein:

FIG. 1 is a schematic circuit diagram of vehicle testing apparatus made according to a preferred embodiment of the invention;

FIG. 2 is an enlarged, fragmentary cross sectional view of a portion of the vehicle testing apparatus shown in FIG. 1.

DESCRIPTION OF THE PREFERRED EMBODIMENT

Figure 3:
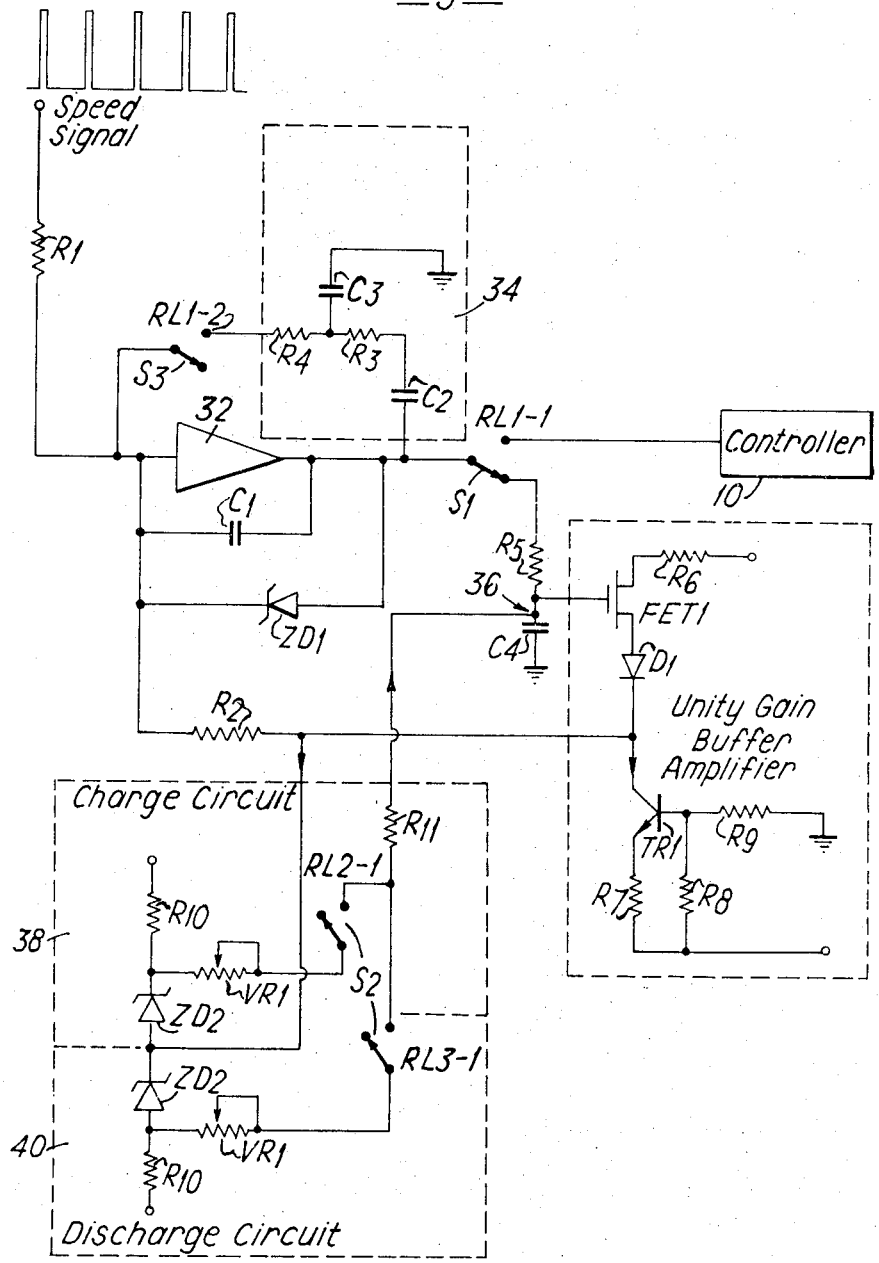
FIG. 3 is a more detailed schematic circuit diagram of part of the circuit of FIG. 1.

As may be seen from the drawings, the vehicle testing apparatus includes a chassis dynamometer, indicated schematically at 2, having two rollers 4 and 6 each for driving engagement with the traction wheels (indicated in ghost outline at 7) of the motor vehicle to be tested. The roller 4 is coupled to the rotor of an eddy current brake 8, the braking torque of which depends upon the power output from a controller 10, the stator of the brake 8 is mounted for pivotal movement about the axis of its rotor against the bias of springs 12. Any braking torque developed by the eddy brake 8 causes its stator to pivot about its axis until the torque is balanced by the springs 12. The amount of pivotal movement against the bias of springs 12 is dependent on the braking torque developed by the eddy current brake. Fixedly mounted on the stator of the eddy current brake is an arm 14 having a forked outer end 16, within which fork a perforated disc 18 is freely rotatably mounted. The perforations of the disc are equally spaced around a circle which is substantially concentric with the axis of rotation of the disc. The edge of the disc 18 is in driving contact with another similar perforated disc 20 which is fixedly mounted in relation to and for rotation with the idling roller 6. The speed of rotation of the disc 18 depends on the product of the speed of rotation of the roller 6 and on the displacement of the disc 18 from the center of rotation of the disc 20 and thus on the product of the speed of rotation of the vehicle's wheels and the braking torque developed by the dynamometer, which product is equal to the traction power output of the vehicle.

FIG. 2 shows a cross section of the disc 20. A photosensitive device 22, 24 is mounted on one side of each of the discs 18 and 20 respectively and a respective lamp L is mounted on the opposite side of each disc so that light from the lamp is incident on its respective photo-sensitive device 22 or 24 when each of the holes in the disc passes. The photo-sensitive device 22 produces a pulse output signal whose frequency is proportional to the speed of rotation of the disc 18 and thus to the traction power output of the vehicle. The photo-sensitive device 24 produces a pulse output signal whose frequency is dependent on the speed of rotation of the disc 20 and thus on the speed of rotation of the vehicle's wheels 7. This apparatus is more fully described in our copending application entitled "Improvements In and Relating to Vehicle Testing Apparatus," filed Mar. 15, 1971.

The pulse output signals from the photo-sensitive devices 22 and 24 are converted to analogue signals by converters 26 and 28 respectively.

Fixedly mounted in relation to and for rotation with the braked roller 4 is another perforated disc 21 which has a similar lamp L and photo-sensitive device 25 the output frequency of which is proportional to the speed of rotation of the roller 4. This may not be quite the same as the speed of rotation of the idle roller 6 due to slippage between the tire and the roller 4. Further, on occasions during tests, the vehicle's wheels can drive off the roller 6 for short periods.

The frequency output signal of the photo-sensitive device 25 is fed to a converter 29 such as a pulse squarer, the leading edge of the pulses triggering a mono-stable circuit which produces an output pulse of fixed duration for each input pulse so that the average output signal is proportional to the speed of rotation of the roller 4.

The analogue speed signal from the converter 29 is fed to an input of a control circuit 30 for controlling the braking torque developed by the eddy current brake 8. The input comprises a resistor $R_1$, connected to an inverting input of a high gain amplifier 32 and is connected to the output of the amplifier by a negative feed back network 34. The network 34 comprises a serially connected capacitor and resistor. These components are so chosen that at low frequencies the amplifier and feed back network act as an integrator and so as to provide optimum stability and response of the apparatus.

In the case where the converter 29 is a mono-stable circuit, the network 34 also acts as a smoothing circuit.

A reference signal from the output of a store 36 is fed via a resistor $R_2$ to an inverting input of the amplifier 32. The output from the amplifier 32 is fed via one of three ganged selection switches $S_1$, $S_2$ and $S_3$ to an input to the store when the switches are in their position 1 or alternatively to an input to the controller 10 when the switches are in their position 2, 3 or 4. In the second case the eddy current brake 8 is controlled so as to produce such a braking torque as to reduce any error between the signals at its inverting and inverting inputs to zero; that is to control the speed of rotation of the roller 4 to correspond to the output signal from the store. Since the feed back network 34 is then connected and since the amplifier 32 and feed back network 34 act together as an integrator, there is no substantial steady state error between the speed signal and the output signal from the store.

When the switches are in their position 1 (as shown in the drawing) the only input to the store is the output from the amplifier 32, and the stored signal is therefore constantly charged to a value corresponding to the speed of rotation to the roller 4 of the dynamometer. No braking torque is developed by the brake 8.

If, when the dynamometer is running, the switch 2 is moved to its position 2, the input to the store is isolated and the input from the amplifier 32 is fed to the input of the controller 10. The torque developed by the eddy current brake 8 is thus so controlled as to maintain the speed of rotation of the dynamometer's roller 4 at a constant value corresponding to the reference signal provided by the output of the store 36.

If, when the dynamometer is running, the switches are moved to their position 3, a charge circuit 38 is connected to the store which is disconnected from the output of the amplifier 32. The charge circuit 38 acts to charge the store so as to increase the magnitude of its stored signal at a constant rate. The output of the store therefore increases at a constant rate and the braking torque developed by the eddy current brake 8 is controlled so as to allow the vehicle being tested to accelerate the rollers of the dynamometer at a corresponding constant rate. When the switches are turned to their position 4, the only input to the store is a discharge circuit 40 which acts to decrease the signal stored at a linear rate so that the output of the store decreases at a constant rate and so controls the braking torque developed by the eddy current brake 8 as to cause the rollers 4 and 6 of the dynamometer to decelerate at a constant rate.

The store 36 may conveniently comprise a capacitor and a buffer output circuit, the capacitor being negatively charged by the output from the amplifier 32 or the charge circuit 38, or discharged by the discharge circuit 40 according to the position of the ganged switches $S_1$, $S_2$.

As is shown in the drawing, the output signal from the converter 26 and a proportion of the output signal from the converter 28 are summed to provide a power output signal which, while the dynamometer is so controlled as to be accelerating or decelerating at constant rate, is substantially equal to the power absorbed by the dynamometer and therefore to the power output of the vehicle being tested. The speed output signal from the converter 28 and the power signal from the amplifier 42 may be fed to respective meters. However, we prefer to feed the signal to the X and Y inputs respectively of an XY plotter which thus enables a power/speed curve for the engine of a vehicle to be quickly and easily plotted.

The converters 26 and 28 may conveniently comprise a pulse squarer the leading edges of each output of which is arranged to trigger a mono-stable circuit so as to provide an output pulse of fixed duration and fixed magnitude for each input pulse from the respective photosensitive device 22 or 24. The average value of the output signal from the mono-stable circuits then corresponds to the braking power developed by the eddy current brake 8 and the speed of rotation of the rollers 4 and 6 respectively. The frequency of the signals so produced is found to be sufficiently high that the testing apparatus as a whole is sensitive only to its average value. The power output signal and speed output signal may then be read by respective meters which are sensitive to the average value of the signal. However, particularly in the case where an XY plotter is used to produce the power/speed graph, it may be preferred to include in each of the converters 26 and 28 a smoothing circuit so arranged to produce an output signal which corresponds to the average value of the output signals of the two mono-stable circuits.

The control circuit 30 is shown in more detail in FIG. 3. As is shown, the high-gain amplifier 32 has a feed back capacitor $C_1$ of relatively small value, the purpose which is so to smooth the output signal of the amplifier that it comprises substantially the average value of the pulse speed input signal. The amplifier also has a zener diode $ZD_1$ connected between its input and output so as to limit its output voltage to a maximum value. The feed back network 34 will be seen to comprise a capacitor $C_2$ which has a relatively large value in series with two resistors $R_3$ and $R_4$ whose junction is connected by a capacitor $C_3$ to earth. These switches $S_1$, $S_2$ and $S_3$ are replaced by relay contacts $RL_{1-1}$, $RL_{1-2}$, $RL_{2-1}$, and $RL_{3-1}$ so that the switches may be operated remotely, for example, from within the car being tested. When contact $RL_{1-2}$ is made, the feed back network 34 acts as an integrator at low frequencies, at higher frequencies the gain is determined by resistors $R_3$ and $R_4$ and at still higher frequencies the feed back is progressively removed by the capacitor $C_3$ providing phase advance at higher frequencies.

The store 36 comprises a serially connected capacitor $C_4$ and resistor $R_5$ which are connected between one of the $RL_{1-1}$ contacts and earth. The junction between the resistor $R_5$ and capacitor $C_4$ is connected to the gate of field effect transistor $FET_1$. The field effect transistor $FET_1$ has a drain resistor $R_6$ and its source is connected via a diode $D_1$ to the collector of a transistor $TR_1$ which is so biased by means of resistors $R_7$, $R_8$ and $R_9$ as to limit the current through the field effect transistor to a substantially constant value. The field effect transistor has a high gate input impedance, and there is negligible drain on the capacitor $C_4$. The junction between the diode $D_1$ and the transistor $TR_1$ is connected to the resistor $R_2$.

The charge and discharge circuits 38 and 40 comprise a resistor $R_{10}$ and zener diode $ZD_2$ which are connected between the output from the unity gain buffer amplifier and a positive or negative supply voltage respectively the junction between each of the resistors $R_{10}$ and the zener diode $ZD_2$ is connected via a relatively large value variable resistor $VR_1$, each of which may be alternatively connected by $RL_{2-1}$ or $RL_{3-1}$ respectively and via a resistor $R_{11}$ to charge the capacitor $C_4$. It will be appreciated that the charge and discharge circuits develop respectively positive or negative voltages of fixed predetermined value with respect to the voltages stored on the capacitor $C_4$, thus providing a constant charging current so that the capacitor $C_4$ charges or discharges at a constant rate depending on which of the two contacts $RL_{2-1}$ or $RL_{3-1}$ is closed.

If neither contact $RL_{2-1}$ or $RL_{3-1}$ is closed and contact $RL_{1-2}$ is closed and contact $RL_{1-1}$ connects the output of the amplifier 32 to the controller 10, the torque developed by the eddy current brake is so controlled as to maintain the speed of rotation of the dynamometer's rollers at a speed corresponding to the output signal of the store 36, i.e., the voltage stored on capacitor $C_4$.

When the contacts $RL_{1-1}$, $RL_{1-2}$, $RL_{2-1}$, and $RL_{3-1}$ are all in the positions shown in FIG. 3, the torque developed by the eddy current brake 8 is zero and the voltage stored in capacitor $C_4$ is maintained at a value substantially proportional to the output of the amplifier 32, and hence to the average value of the pulse speed signal.

Those skilled in the art will recognize that the preferred embodiment described herein may be altered and modified without departing from the spirit and scope of the invention as defined in the appended claims.

What is claimed is:

1. In a motor vehicle testing system including a chassis dynamometer having rollers moved by a source of power, improved apparatus for controlling the speed of the rollers comprising:

means for generating a speed signal dependent on the speed of at least one of the dynamometer rollers;

store means for storing and providing a reference signal;

first control means connected to the means for generating and store means for comparing the speed signal with the reference signal;

second control means for applying a force to at least one of the dynamometer rollers; and selection means for connecting the store means and first control means in a first mode of operation to charge the store means so that the reference signal is updated to a value corresponding to the speed of the one dynamometer roller and for connecting the first control means and second control means in a second mode of operation to control the braking torque developed by the dynamometer so that the speed of at least one dynamometer roller is maintained at a value corresponding to the value of the reference signal.

2. Apparatus, as claimed in claim 1, wherein the first control means comprises:

an amplifier having an output, a first input for receiving the speed signal, and a second input for receiving the reference signal; and a negative feed back loop for the amplifier.

3. Apparatus, as claimed in claim 2, wherein the selection means comprises:
  first switch means for connecting the amplifier output to the second control means and for connecting the amplifier output through the negative feedback loop to the first amplifier input so that the braking torque developed by the dynamometer is controlled; and
  second switch means for connecting the amplifier output to the store means so that the reference signal is maintained at a value corresponding to the speed of the one dynamometer roller.

4. Apparatus, as claimed in claim 1, and further comprising:
  means for charging the store means at a predetermined constant rate; and
  means for discharging the store means at a predetermined constant rate.

* * * * *